United States Patent
Daniels

(10) Patent No.: US 11,466,460 B2
(45) Date of Patent: Oct. 11, 2022

(54) ROOF VENT FOR SUPPORTING AN EXTENSION MEMBER

(71) Applicant: Gregory S. Daniels, Santa Rosa, CA (US)

(72) Inventor: Gregory S. Daniels, Santa Rosa, CA (US)

(*) Notice: Subject to any disclaimer, the term of this patent is extended or adjusted under 35 U.S.C. 154(b) by 0 days.

(21) Appl. No.: 16/950,278

(22) Filed: Nov. 17, 2020

(65) Prior Publication Data

US 2021/0310248 A1    Oct. 7, 2021

Related U.S. Application Data

(63) Continuation of application No. 16/420,525, filed on May 23, 2019, now Pat. No. 10,844,602, which is a continuation of application No. 15/870,526, filed on Jan. 12, 2018, now Pat. No. 10,312,854, which is a continuation of application No. 15/182,949, filed on Jun. 15, 2016, now Pat. No. 9,869,093, which is a continuation of application No. 14/549,290, filed on Nov. 20, 2014, now Pat. No. 9,394,693.

(60) Provisional application No. 61/907,529, filed on Nov. 22, 2013.

(51) Int. Cl.
*E04D 13/17* (2006.01)
*E04D 1/30* (2006.01)

(52) U.S. Cl.
CPC .............. *E04D 13/17* (2013.01); *E04D 1/30* (2013.01); *E04D 2001/309* (2013.01)

(58) Field of Classification Search
CPC ...... E04D 13/17; E04D 1/30; E04D 2001/309
See application file for complete search history.

(56) References Cited

U.S. PATENT DOCUMENTS

| | | | |
|---|---|---|---|
| 2,733,649 A | 2/1956 | Barron |
| 3,376,164 A | 4/1968 | Bachwansky |
| 3,658,596 A | 4/1972 | Osborne |
| 4,040,867 A | 8/1977 | Forestier et al. |
| 4,083,097 A | 4/1978 | Anagnostou et al. |
| 4,097,308 A | 6/1978 | Klein et al. |
| 4,189,881 A | 2/1980 | Hawley |
| 4,224,081 A | 9/1980 | Kawanura et al. |
| 4,239,555 A | 12/1980 | Scharkack et al. |

(Continued)

FOREIGN PATENT DOCUMENTS

| | | |
|---|---|---|
| DE | 198 23 356 A1 | 11/1999 |
| GB | 2 279 453 A | 1/1995 |

(Continued)

OTHER PUBLICATIONS

Aztec Washer Company's Master Flash Solar Applications Catalogue, published Oct. 2014, 1 page.

(Continued)

*Primary Examiner* — Andrew J Triggs
(74) *Attorney, Agent, or Firm* — Knobbe, Martens, Olson & Bear, LLP

(57) ABSTRACT

A roof vent for supporting a solar panel is provided. The roof vent includes a vent member and a solar panel support element. The vent member is sized and shaped to mimic the appearance of a roof cover element. The vent member includes an upper portion and a lower portion, the upper portion separated from the lower portion by a gap. The solar panel support element is attached to the vent member.

20 Claims, 16 Drawing Sheets

(56) References Cited

U.S. PATENT DOCUMENTS

| | | | |
|---|---|---|---|
| D261,803 S | 11/1981 | Bohanon, Jr. | |
| 4,314,548 A | 2/1982 | Hanson | |
| 4,383,129 A | 5/1983 | Gupta et al. | |
| 4,418,685 A | 12/1983 | Frazier | |
| 4,432,273 A | 2/1984 | Devitt | |
| 4,433,200 A | 2/1984 | Jester et al. | |
| 4,574,160 A | 3/1986 | Cull et al. | |
| 4,602,739 A | 6/1986 | Sutton, Jr. | |
| D285,829 S | 9/1986 | Lock | |
| 4,608,792 A * | 9/1986 | Gerber | E04D 13/17 454/240 |
| 4,625,469 A | 12/1986 | Gentry et al. | |
| 4,677,903 A | 7/1987 | Mathews, III | |
| 4,692,557 A | 9/1987 | Samuelson et al. | |
| 4,759,272 A | 7/1988 | Zaniewski | |
| 4,843,794 A | 7/1989 | Holtgreve | |
| 4,850,166 A | 7/1989 | Taylor | |
| 4,965,971 A | 10/1990 | Jean-Jacques et al. | |
| 4,977,818 A | 12/1990 | Taylor et al. | |
| 4,986,469 A | 1/1991 | Sutton, Jr. | |
| 5,048,255 A | 9/1991 | Gonzales | |
| 5,060,444 A | 10/1991 | Paquette | |
| 5,078,047 A | 1/1992 | Wimberly | |
| 5,121,583 A | 6/1992 | Hirai et al. | |
| 5,131,200 A | 7/1992 | McKinnon | |
| 5,131,888 A | 7/1992 | Adkins, II | |
| 5,228,925 A | 7/1993 | Nath et al. | |
| 5,232,518 A | 8/1993 | Nath et al. | |
| 5,296,043 A | 3/1994 | Kawakami et al. | |
| 5,316,592 A | 5/1994 | Dinwoodie | |
| 5,333,783 A | 8/1994 | Catan | |
| 5,391,235 A | 2/1995 | Inoue | |
| 5,480,494 A | 1/1996 | Inoue | |
| 5,486,238 A | 1/1996 | Nakagawa et al. | |
| 5,505,788 A | 4/1996 | Dinwoodie | |
| 5,549,513 A | 8/1996 | Thomas et al. | |
| 5,603,187 A | 2/1997 | Merrin | |
| 5,620,368 A | 4/1997 | Bates et al. | |
| 5,672,101 A | 9/1997 | Thomas | |
| 5,697,192 A | 12/1997 | Inoue | |
| 5,706,617 A | 1/1998 | Hirai et al. | |
| 5,722,887 A | 3/1998 | Wolfson et al. | |
| 5,746,839 A | 5/1998 | Dinwoodie | |
| 5,990,414 A | 11/1999 | Posnansky | |
| 6,005,236 A | 12/1999 | Phelan et al. | |
| 6,008,450 A | 12/1999 | Ohtsuka et al. | |
| 6,050,039 A | 4/2000 | O'Hagin | |
| 6,051,774 A | 4/2000 | Yoshida et al. | |
| 6,061,978 A | 5/2000 | Dinwoodie et al. | |
| 6,105,317 A | 8/2000 | Tomiuchi et al. | |
| 6,129,628 A | 10/2000 | O'Hagin et al. | |
| 6,155,006 A | 12/2000 | Mimura et al. | |
| 6,242,685 B1 | 6/2001 | Mizukami et al. | |
| 6,294,724 B1 | 9/2001 | Sasaoka et al. | |
| 6,306,030 B1 | 10/2001 | Wilson | |
| 6,311,436 B1 | 11/2001 | Mimura et al. | |
| 6,336,304 B1 | 1/2002 | Mimura et al. | |
| 6,354,051 B1 * | 3/2002 | O'Hagin | E04D 13/17 52/302.1 |
| 6,365,824 B1 | 4/2002 | Nakazima et al. | |
| 6,447,390 B1 | 9/2002 | O'Hagin | |
| 6,453,629 B1 | 9/2002 | Nakazima et al. | |
| 6,491,579 B1 | 12/2002 | O'Hagin | |
| 6,501,013 B1 | 12/2002 | Dinwoodie | |
| 6,541,693 B2 | 4/2003 | Takada et al. | |
| 6,606,830 B2 | 8/2003 | Nagao et al. | |
| 6,799,742 B2 | 10/2004 | Nakamura et al. | |
| 6,870,087 B1 | 3/2005 | Gallagher | |
| 7,053,294 B2 | 5/2006 | Tuttle et al. | |
| 7,101,279 B2 | 9/2006 | O'Hagin et al. | |
| 7,178,295 B2 | 2/2007 | Dinwoodie | |
| 7,250,000 B2 | 7/2007 | Daniels, II | |
| 7,297,866 B2 | 11/2007 | Aschenbrenner | |
| 7,320,774 B2 | 1/2008 | Simmons et al. | |
| 7,469,508 B2 | 12/2008 | Ceria | |
| 7,506,477 B2 | 3/2009 | Flaherty et al. | |
| 7,509,775 B2 | 3/2009 | Flaherty et al. | |
| 7,531,740 B2 | 4/2009 | Flaherty et al. | |
| 7,578,102 B2 | 8/2009 | Banister | |
| 7,587,864 B2 | 9/2009 | McCaskill et al. | |
| 7,618,310 B2 | 11/2009 | Daniels | |
| 7,642,449 B2 | 1/2010 | Korman et al. | |
| 7,678,990 B2 | 3/2010 | McCaskill et al. | |
| 7,736,940 B2 | 6/2010 | Basol | |
| 7,774,998 B2 | 8/2010 | Aschenbrenner | |
| 7,797,883 B2 | 9/2010 | Tarbell | |
| 7,861,485 B1 | 1/2011 | Wentworth et al. | |
| 7,901,278 B2 * | 3/2011 | O'Hagin | F24F 7/02 454/366 |
| 8,607,510 B2 | 12/2013 | Daniels | |
| 8,608,533 B2 | 12/2013 | Daniels | |
| 8,739,478 B1 | 6/2014 | Burtt | |
| 8,833,032 B2 | 9/2014 | Schaefer | |
| 8,833,033 B2 | 9/2014 | Schaefer | |
| 8,910,448 B2 * | 12/2014 | Okada | F24S 25/61 52/705 |
| 8,950,157 B1 | 2/2015 | Schrock | |
| 9,003,730 B2 * | 4/2015 | Daniels | E04D 1/30 52/198 |
| 9,027,289 B1 | 5/2015 | Burtt | |
| 9,038,330 B2 | 5/2015 | Bellavia | |
| 9,074,781 B2 | 7/2015 | Daniels | |
| 9,394,693 B2 | 7/2016 | Daniels | |
| 9,869,093 B2 | 1/2018 | Daniels | |
| 2001/0027804 A1 | 10/2001 | Inoue et al. | |
| 2003/0000158 A1 | 1/2003 | Borges | |
| 2004/0098932 A1 | 5/2004 | Broatch | |
| 2005/0191957 A1 | 9/2005 | Demetry et al. | |
| 2005/0239394 A1 | 10/2005 | O'Hagin et al. | |
| 2006/0052047 A1 | 3/2006 | Daniels, II | |
| 2006/0052051 A1 | 3/2006 | Daniels, II | |
| 2006/0124827 A1 | 6/2006 | Janus et al. | |
| 2007/0072541 A1 | 3/2007 | Daniels, II et al. | |
| 2007/0207725 A1 | 9/2007 | O'Hagin | |
| 2007/0243820 A1 | 10/2007 | O'Hagin | |
| 2007/0246095 A1 | 10/2007 | Schaefer | |
| 2008/0040990 A1 | 2/2008 | Vendig et al. | |
| 2008/0098672 A1 | 5/2008 | O'Hagin et al. | |
| 2008/0098674 A1 * | 5/2008 | Daniels | E04D 1/08 52/748.1 |
| 2010/0170163 A1 | 7/2010 | Tarbell | |
| 2010/0229940 A1 | 9/2010 | Basol | |
| 2010/0330898 A1 | 12/2010 | Daniels | |
| 2012/0038162 A1 | 2/2012 | Smith | |
| 2012/0178357 A1 | 7/2012 | Rheaume | |
| 2012/0190288 A1 * | 7/2012 | Willen | E04D 13/1476 454/250 |
| 2015/0143760 A1 | 5/2015 | Daniels | |
| 2016/0289970 A1 | 10/2016 | Daniels | |

FOREIGN PATENT DOCUMENTS

| | | |
|---|---|---|
| GB | 2 345 536 A | 7/2000 |
| JP | 59-060138 | 4/1984 |
| JP | 06-272920 | 9/1994 |
| JP | 11-044035 | 2/1999 |
| JP | 11229576 | 8/1999 |
| JP | 2000-274032 | 10/2000 |

OTHER PUBLICATIONS

Spider-Rax Black Widow Catalogue, publication date unknown, 2 pages.

Quick Mount PV Product Catalogue, published Oct. 2014, 4 pages.

* cited by examiner

ROOF VENT FOR SUPPORTING AN EXTENSION MEMBER

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 16/420,525, filed May 23, 2019, which is a continuation of U.S. patent application Ser. No. 15/870,526, filed Jan. 12, 2018, which is a continuation of U.S. patent application Ser. No. 15/182,949, filed Jun. 15, 2016, which is a continuation of U.S. patent application Ser. No. 14/549,290, filed Nov. 20, 2014, which claims priority to U.S. Provisional Patent Application No. 61/907,529, filed Nov. 22, 2013, the full disclosures of which are incorporated herein by reference.

BACKGROUND

Field of the Invention

The present invention relates generally to roofs for buildings, and specifically to integration of solar panels into roofs.

Description of the Related Art

For decades, builders and solar power companies have installed solar panels onto the roofs of buildings. The solar panels absorb solar radiation that can be stored in a solar cell, advantageously providing a free source of power for the building. Such solar panels are generally rigid and flat in shape, and are supported on the roof of the building with a supporting frame or other structure.

SUMMARY

One problem with conventional roofs having solar panels is that the solar panels tend to be bulky and can be difficult to install onto a roof that is covered with roof cover elements, such as tiles. Solar panels can also become inefficient at increased temperatures, which can occur, for example, with roof structures that lack sufficient ventilation.

In one aspect, a roof vent for supporting a solar panel is provided. The roof vent includes a vent member and a solar panel support element. The vent member is sized and shaped to mimic the appearance of a roof cover element. The vent member includes an upper portion and a lower portion, the upper portion separated from the lower portion by a gap. The solar panel support element is attached to the vent member.

In another aspect, a roof vent for supporting a solar panel is provided. The vent includes an upper vent member with a mounting hole extending through an exposed upper surface. A solar panel support element is attached to the upper vent member and configured to support a solar panel at a position above the upper vent member.

In some implementations, the solar panel support element includes a body with a body hole extending through the body such that the body hole and the mounting hole are coaxially aligned. In some implementations, the body extends upwardly from the upper surface of the upper vent member.

In some implementations, the solar panel support element includes a body with a hole extending through the body.

In some implementations, the upper surface of the upper portion of the vent member is curvilinear. In some implementations, the solar panel support element is positioned on an apex of the upper surface.

In some implementations, the upper vent member includes an upper portion and a lower portion, the upper portion separated from the lower portion by a gap, further including a second solar panel support element positioned between the upper and lower portions. In some implementations, the second solar panel support element extends from an upper surface of the lower portion towards a lower surface of the upper portion. In some implementations, the second solar panel support element extends between and connects a lower surface of the upper portion to an upper surface of the lower portion.

In some implementations, the mounting hole includes a first mounting hole extending through the upper portion, further including a second mounting hole extending through the lower portion and coaxially aligned with the first mounting hole. In some implementations, the first solar panel support element includes a first body with a first body hole extending through the first body and coaxially aligned with the first mounting hole, the second solar panel support element including a second body with a second body hole extending through the second body and coaxially aligned with the second mounting hole, and wherein the first body hole, the second body hole, the first mounting hole, and the second mounting hole are coaxially aligned with respect to each other. In some implementations, the lower portion of the upper vent member further includes two screens laterally separated with respect to each other on the lower portion, with the second mounting hole positioned between the two screens, and wherein the screens are configured to permit airflow between a region below the lower portion and the gap.

In some implementations, the solar panel support element includes a base configured to attach to a roof deck, and an extension member configured to extend upwardly from the base and through the mounting hole. In some implementations, the roof vent further includes a lower vent member permitting airflow between a region below a roof deck and a region between the roof deck and the upper vent member, wherein the lower vent member is laterally offset with respect to the upper vent member. In some implementations, the solar panel support element further includes an offsetting member positioned between the extension member and the base, wherein the offsetting member extends laterally from the base. In some implementations, the vent further includes a lower vent member permitting airflow between a region below the roof deck and a region between the roof deck and the upper vent member, and wherein the upper vent member, the extension member, and the lower vent member are approximately aligned with respect to each other. In some implementations, the upper vent member comprises an upper portion and a lower portion, the upper portion separated from the lower portion by a gap, wherein the extension member is configured to extend through the upper portion and the lower portion.

In another aspect, a method of providing support for a solar panel on a roof is provided. The method includes installing a lower vent member onto an opening of a roof deck to allow airflow between a region below the roof deck and a region above the lower vent member. The method also includes installing an upper vent member above the lower vent member, to allow airflow between the region above the lower vent member and a region above the upper vent member. Installing the upper vent member includes extending an extension member through an opening extending through an upper exposed surface of the upper vent member.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

DETAILED DESCRIPTION

Figure 1A:
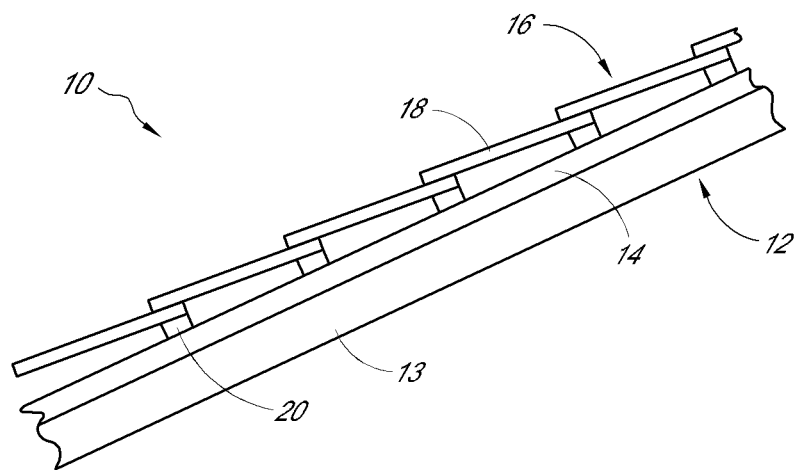
FIG. 1A is a cross-sectional side view of a portion of a tile roof.

FIG. 1A shows an exemplary tile roof 10 comprising a roof frame 12, a roof deck 14 supported on the roof frame 12, and a layer 16 of roof cover elements. In this embodiment, the roof cover element layer 16 comprises a layer of tiles 18. However, the roof cover elements may alternatively comprise other elements, such as shingles (e.g., made of steel, metal, composition material, wood, or other materials). The tiles 18 may be formed of, e.g., metal, clay, concrete, plastic, or other materials. The roof frame 12 may comprise rafters 13 that extend from an upper ridge (not shown) of the roof to a lower eave (not shown). The roof frame 12 may also comprise purlins (not shown) that extend substantially parallel to the ridge and eave and substantially perpendicular to the rafters 13. The roof deck 14 typically comprises plywood, metal, or some type of alloy (e.g., steel) sheeting. The roof cover element layer 16 typically comprises a plurality of tiles 18 supported on battens 20 oriented substantially parallel to the ridge and eave (and substantially perpendicular to the rafters 13). In the illustrated roof 10, each batten 20 directly supports an upper edge of a tile 18, which in turn supports a lower edge of an immediately adjacent tile 18. In this arrangement, water tends to flow over each tile's lower edge onto another tile 18. The illustrated tiles 18 are flat tiles, as known in the art. Alternative tile shapes are also possible, including so-called "S-shaped" or "M-shaped" tiles, which are described below, and many other tile shapes. As used herein, the terms "flat tile," "S-shaped tile," and "M-shaped tile" are to be construed as having their understood meanings within the roofing industry. It will be understood that the roof cover elements may be formed of a variety of materials, such as, without limitation, wood shingles, composition shingles, metal shingles, steel shingles, metal (e.g., sheet metal) tiles, clay tiles, concrete tiles, plastic tiles, or other materials.

Figure 1B:
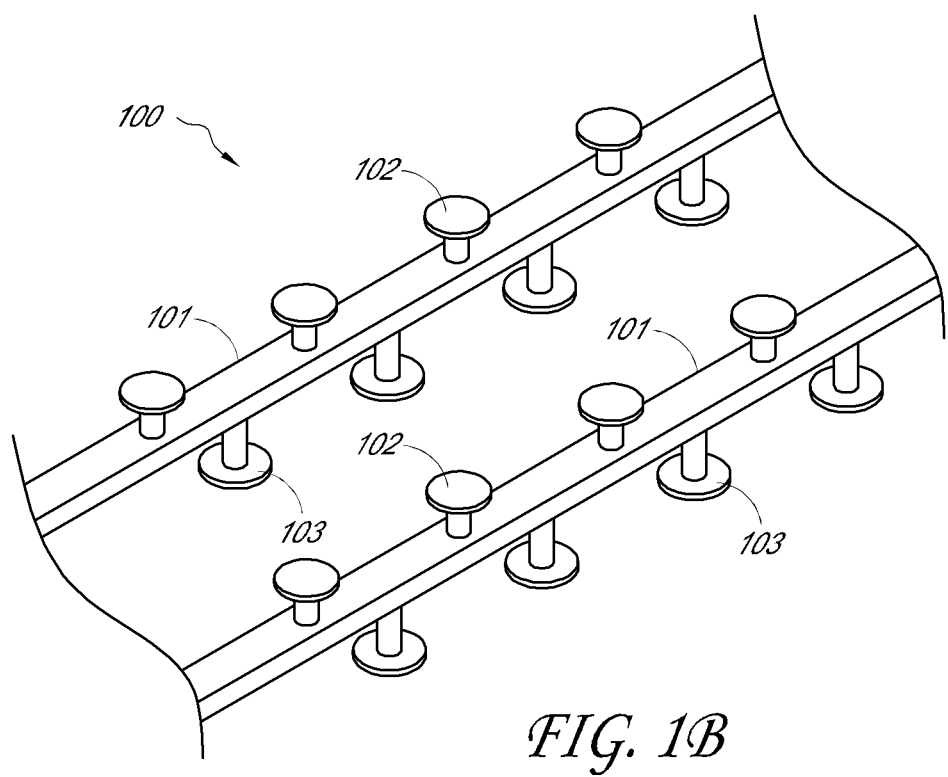
FIG. 1B is a perspective view of a support frame for supporting a solar panel on a roof.

FIG. 1B is a perspective view of a support frame 100 for supporting a solar panel on a roof, such as the roof 10 shown in FIG. 1A. Frame 100 can include rails 101 with fasteners 102 to secure a solar panel to the rails 101. Frame 100 can include feet 103 to secure frame 100 to a roof. Frame 100 can be any shape suitable to support a solar panel on a roof, and the shape shown in FIG. 1A is for illustrative purposes only.

It can be difficult to mount frame 100 to a roof, such as a sloped roof. For example, it can be difficult to attach a solar panel support structure, such as frame 100 (FIG. 1B) onto a roof that is covered in roof elements, such as tiles, because the tiles prevent access to the roof, and the support structure cannot be bolted directly to the tiles. Additionally, solar panels can become inefficient at increased temperatures, which may occur, for example, on roofs with limited or no ventilation. Thus, it may be advantageous to provide a roof vent that can both provide infrastructure for mounting solar panels, while providing ventilation to the interior of the home, underneath the roof elements, and to the solar panels themselves.

Figure 2A:
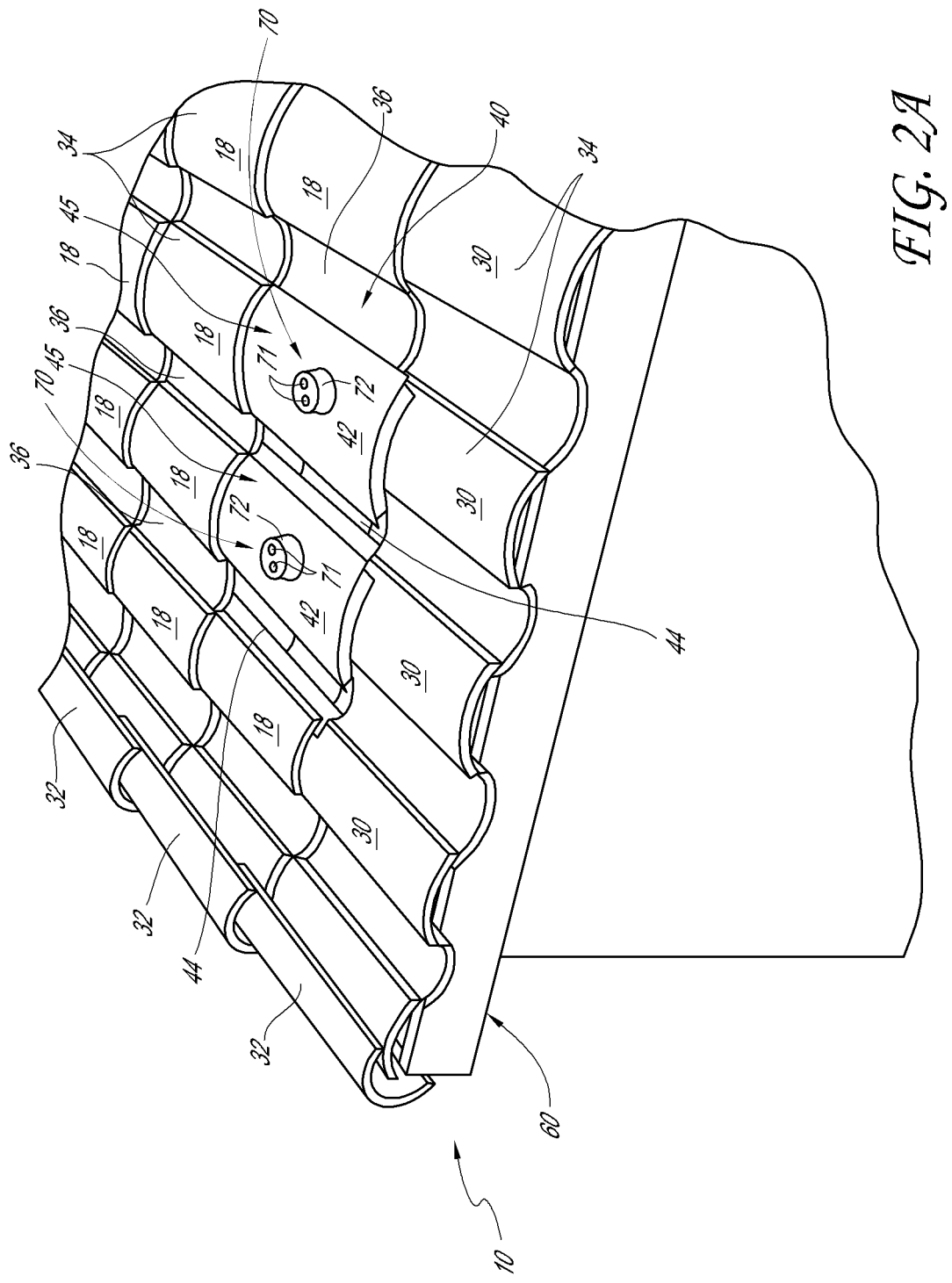
FIG. 2A is a perspective view of a tile roof comprising S-shaped tiles and having a plurality of S-shaped tile vents.

FIG. 2A is a perspective view of a section of a pitched tile roof 10 near an eave 60, in accordance with one embodiment of the invention. The roof 10 comprises S-shaped roof tiles 18. A row of edge tiles 30 are provided at the eave 60, and a column of edge caps 32 are provided on the side edges of the roof 10. Ridge caps (not shown) can be provided at the ridge (not shown). In this particular configuration, the tiles 18 and 30 each include a cap area 34 and a pan area 36. The cap areas 34 and pan areas 36 of vertically aligned tiles 18, 30 form cap columns and pan channels, respectively, such that the roof comprises alternating parallel cap columns and pan channels.

Figure 2B:
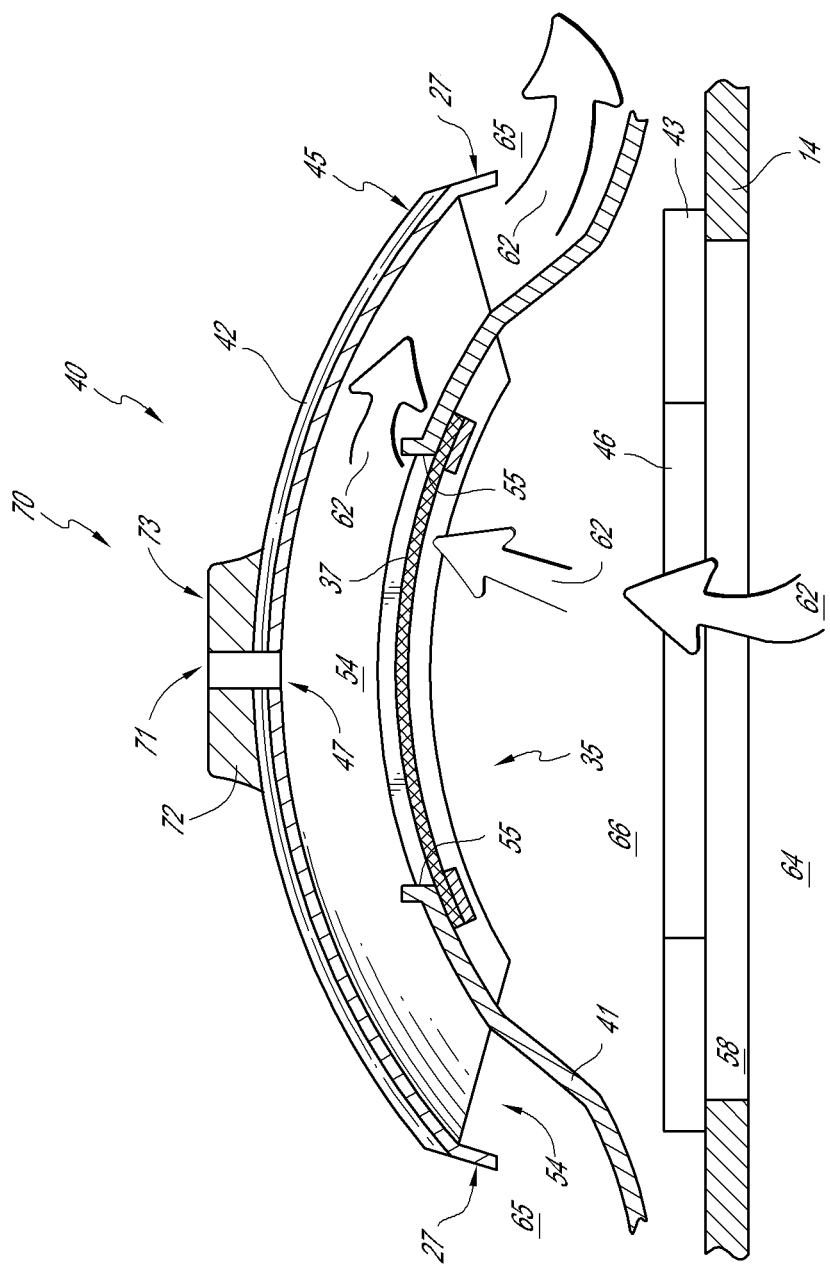
FIG. 2B is a cross-sectional view of a portion of the S-shaped tile vent of FIG. 2A.
Figure 2C:
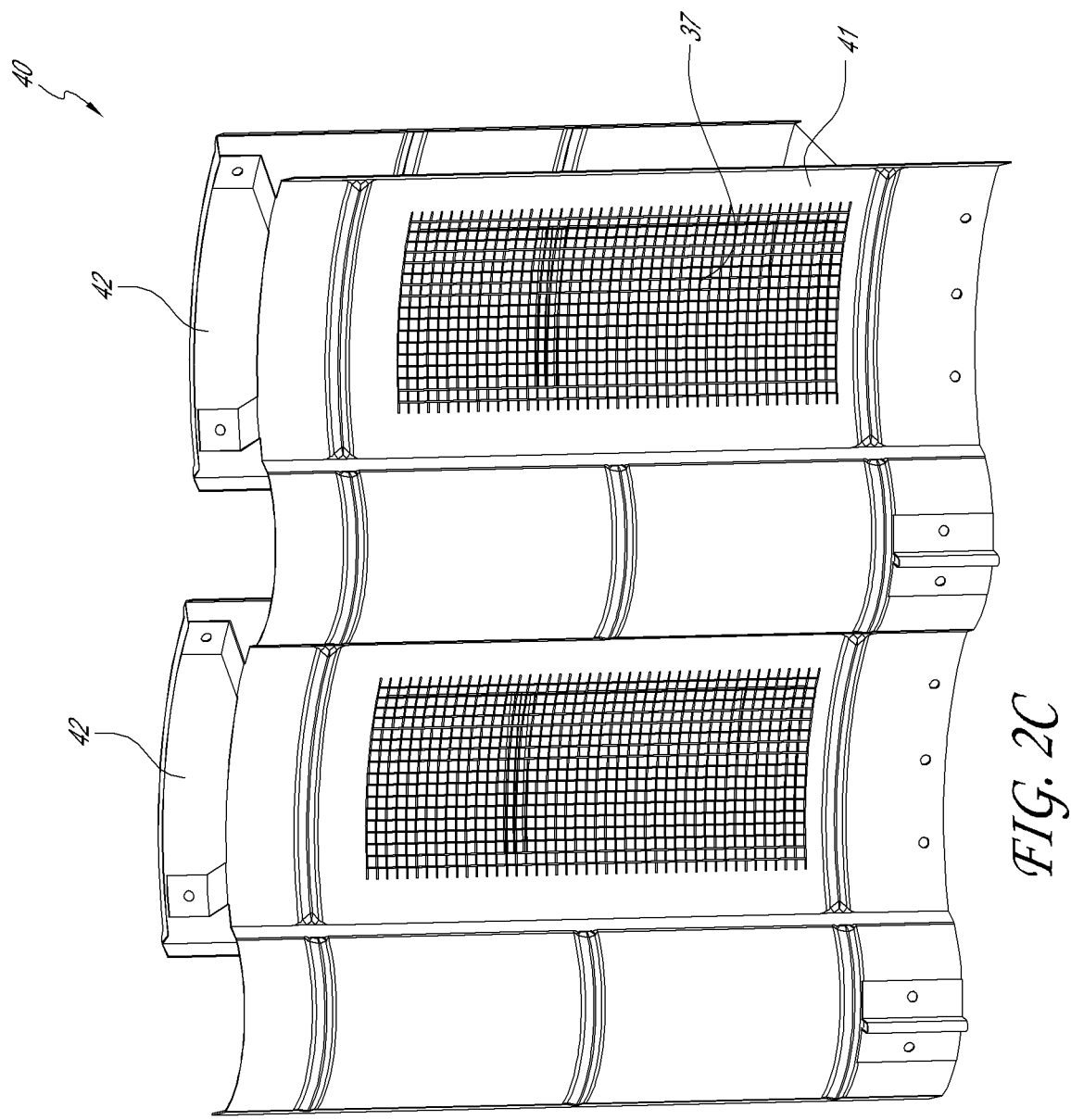
FIG. 2C is a bottom view of the S-shaped tile vent of FIG. 2A.

The illustrated roof 10 of FIG. 2A includes a tile vent 40 preferably adapted to blend into the roof 10 and mimic the appearance of one or more of the roof tiles 18. FIG. 2B is a cross-sectional view of a portion of the S-shaped tile vent of FIG. 2A. FIG. 2C is a bottom view of the S-shaped tile vent of FIG. 2A. The vent 40 preferably includes one or more cap sections 42 and corresponding pan sections 44. As such, each cap section 42 and corresponding pan section 44 preferably mimics the appearance of one cap section 34 and pan section 36, respectively. In the illustrated embodiment, the tile vent 40 mimics the appearance of two roof tiles 18. However, skilled artisans will appreciate that the vent 40 can mimic the appearance of any desired number of roof tiles 18, including just one roof tile 18, or more than two roof tiles 18. In this document, roof cover elements (e.g., roof tiles) and roof vents (e.g., tile vents) may be collectively referred to as "roof members."

The illustrated tile vent 40 comprises a primary vent member (which may also be referred to herein as a "sub-flashing" or lower vent member) 43 and a secondary vent member (which may also be referred to herein as a "cover" or upper vent member) 45 spaced above the primary vent member 43. The primary vent member 43 is secured to the roof deck 14, over a roof deck aperture 58 thereof. The roof deck aperture 58 provides fluid communication between the attic 64 of the building and a space 66 (such as a batten cavity) above the roof deck 14. The primary vent member 43 includes a vent opening 46 (which may be screened, such as the primary vent member 43 shown in FIG. 4A) that fluidly communicates with the roof deck aperture 58. The vent opening 46 can be approximately circular, cylindrical, or other suitable shapes to allow airflow therethrough. The vent opening 46, and primary vent member 43 can be sized, shaped, and positioned on the roof deck 14, to allow it to fit between battens on the roof deck 14. In some embodiments, the secondary vent member 45 either lies on top of the roof or rests upon the primary vent member 43, and in some embodiments can be secured to the lower member 43. In the embodiments wherein the upper member is not secured to the lower member, the roof vent is described as an "open system" roof vent. An open system roof vent can allow for easier installation, and can allow air flow through the lower member, through the batten cavity, and out through gaps in surrounding roof elements, as well as through the upper member. In the embodiments wherein the upper member is secured to the lower member, the roof vent is described as a "closed" roof vent, in which air flows directly from an interior attic space.

The secondary vent member 45 may be spaced generally above the primary vent member 43. The secondary vent member 45 may be secured to the primary vent member 43. For example, spacer elements may be used to both secure and space vent members 43 and 45 with respect to each other (not shown). The secondary vent member 45 can also be secured to adjacent surrounding tiles, such as to an upper or lower tile 18, 30 (e.g., with a storm clip). While such an embodiment ensures a desired physical relationship between the primary vent member 43 and the secondary vent member 45, it can also be problematic when the surrounding tiles (e.g., 18, 30, 32) are positioned inaccurately with respect to the secondary vent member 45. In general, a high degree of skill is required in the installation of the tiles and tile vent(s) for accurate positioning thereof. In an alternative embodiment, the secondary vent member 45 is secured to one or more adjacent tiles in the roof's field of tiles, without being secured to the primary vent member 43. For example, the secondary vent member 45 can be secured (e.g., by a storm clip) to a lower and/or upper adjacent tile of a pitched roof (i.e., a tile in an adjacent upper or lower row). This embodiment allows for greater flexibility in the positioning of the tiles relative to the primary vent member 43.

The secondary vent member 45 need not be installed directly above primary vent member 43. For example, in some embodiments a roof cover element such as a tile, or other component than the secondary vent member 45 can be installed directly above the primary vent member 43. The secondary vent member 45 can be installed above, but not directly above, the primary vent member 43. For example, the secondary vent member 45 can be installed in a lateral position relative to the primary vent member 43, such as in a position adjacent to the tile or other component. Such an arrangement is described herein as having the secondary vent member 45 laterally offset from the primary vent member 43. The secondary vent member 45 can be laterally offset from the primary vent member 43 in a position upslope (towards the ridge) or downslope (towards the eaves) from the primary vent member 43. In other embodiments, the secondary vent member 45 can be laterally offset from the primary vent member 43 in a transverse position (e.g., to the left or right as shown, typically in a direction parallel to the ridge for common roof shapes) from the secondary vent member 45. The secondary vent member 45 can be laterally offset upslope or downslope and transverse relative to the primary vent member 43. The distance by which the secondary vent member 45 can be laterally offset from the primary vent member 43 can vary. For example, the secondary vent member 45 can be laterally adjacent to another roof cover element, such as a tile, that is positioned directly above the primary vent member 43, or can be laterally offset by two or more roof cover elements, relative to the primary vent member 43.

The illustrated secondary vent member 45 includes a first portion or "skeleton" 41 with a vent opening 35 generally above the vent opening 46. The first portion 41 may also be referred to herein as a lower portion of secondary vent member 45. In some embodiments, the vent opening 35 is covered by a screen 37. Elongated upstanding baffles 55 can be provided to help prevent wind-driven rain from flowing down through the vent opening 35. The cap member 42 (which also may be referred to herein as an upper portion of the secondary vent member 45) is preferably secured to the skeleton 41 so that a ventilation space 54 is formed therebetween, for example by using any of a wide variety of different types of spacer elements. The cap member 42 is preferably positioned above the vent opening 35 to substantially prevent the ingress of rain through the vent opening 35. Elongated side hems or downward baffles 27 can be provided to help prevent wind-driven rain from flowing down through the vent opening 37. In use, attic air 62 flows from the attic 64 through the roof deck aperture 58, vent opening 46, space or batten cavity 66, vent opening 35, and ventilation space 54 to the outside 65.

FIG. 2B shows a single cap section 42 above the opening 46 of the primary vent member 43. Thus, FIG. 2B is a simplification of the tile vent 40 of FIGS. 2A and 2C, which includes two cap sections 42 and two pan sections 44. Skilled artisans will understand that the tile vent 40 can have any number of cap sections and pan sections, and that all of such sections are preferably provided generally above one opening 46 of the primary vent member 43. Also, the secondary vent member 45 can replace any number of tiles in a field of tiles, including just one such tile.

Vent 40 can include one or more solar panel support elements 70 configured (sized and shaped) in any way suitable to support a portion of a solar panel and/or solar panel support frame, such as frame 100 (FIG. 1B). Element 70 can include a body 72 extending (e.g., upwardly) from a portion of vent 40. For example, body 72 can extend from a portion of vent 40 that faces an exterior environment, or away from a roof, when vent 40 is mounted on a roof. Body 72 can extend from a portion of the cap areas 34 and/or pan areas 36. In the illustrated embodiment of FIG. 2B, body 72 extends from an upper-facing surface of the cap member 42. In some embodiments, body 72 extends from an apex of a curved portion of a vent, such as an apex of the cap member 42 of the S-shaped vent 40 as shown. Element 70 can be permanently or removably attached to a portion of vent 40 with a weld, threaded fastener, or similar attachment structure. Element 70 can be substantially cylindrically shaped, such as the "stump-like" shape shown. Element 70 may be sealed, through welding, o-rings, gaskets, or other sealing structure, at its point of attachment to the remainder of vent 40 (such as cap 42), to prevent leakage through the vent.

The solar panel support element 70 can include one or more engagement portions 71 suitably configured to mechanically engage the element 70 with a solar panel and/or solar panel support frame. In some embodiments, engagement portion 71 may be a hole which extends either partially or completely through the body 72 of element 70. Engagement portion 71 may also comprise a plurality of holes extending into or through the body 72 of element 70. For example, in FIG. 2A, engagement portion 71 includes two holes; however, it will be understood that engagement portion 71 may include any number of holes or may be omitted entirely.

Engagement portion 71 can also include threads, snaps, or any structure suitable to facilitate engagement between two components. In the illustrated embodiment of FIG. 2B, engagement portion 71 is configured as an opening extending through body 72, to allow a bolt, screw, or other mechanical fastener to extend through element 70 and hold a solar panel and/or frame thereto. The opening can be threaded or without threads. The engagement portion 71 can be aligned with a corresponding mounting hole 47 extending through a portion of vent 40, such as cap member 42, to allow a bolt, screw, or other fastener to extend through a portion of vent 40 and secure the solar panel/frame to the vent 40. This allows vent 40 (or a plurality thereof), which is typically made of a stronger material than a roof element, to provide increased support to a solar panel/frame.

In some embodiments, the engagement portion 71 does not extend all the way through the body 72 and cap member 42 may not include a mounting hole 47. In such an embodiment, engagement portion 71 may be threaded or otherwise configured so that a solar panel or support frame can be attached (e.g., bolted) thereto. In some embodiments, engagement portion 71 may not be included and the solar panel support element may be configured with only a support surface 73 to which a solar panel or support frame can be directly attached, e.g. by welding, adhesive, nails, or staples, or other suitable attachment means.

Mounting hole 47 may extend through an exposed upper surface of secondary vent member 45. As used herein, the term "exposed" is intended to mean a portion of the exterior surface of vent 40 that remains uncovered when the vent is installed onto a roof. When a roof vent member is installed onto a roof, a portion of the roof element upslope of the vent member, generally overlaps a portion of the downslope roof vent member. For example, as shown in FIG. 2A, the upper edges of the vent members 45 are covered by the lower edges of the upslope roof tiles 18. This is done so that as water rolls off the higher roof member, it falls onto a lower vent member, thus helping to create a water tight roof structure. An "exposed exterior surface" is thus a surface that remains uncovered once the roof member is installed onto a roof. In some embodiments, the mounting hole 47 may extend through a central portion of an exposed exterior surface of secondary vent member 45, as depicted in FIG. 2A. For example, the mounting hole 47 can be positioned within the central 90% away from the upper and lower edge of the upper vent member 45, for greater stability, and to avoid interfering with the overlapping edges of the upper vent member 45 and any adjacent roof elements. For example, the mounting hole 47 may be positioned at a point greater than 5%, 10%, 15%, 25%, 30%, 40%, or 50%, relative to the distance from any adjacent edge of the roof vent member.

Mounting hole 47 provides an attachment point where a solar panel can be attached, either directly or indirectly, by means of a solar panel support element (e.g., element 70 or others described herein), to secondary vent member 45. In some embodiments mounting hole 47 may be an opening through which a bolt or other fastener can extend. Mounting hole 47 may also be threaded, so that a bolt can be inserted into threaded-engagement with mounting hole 47. Accordingly, the size of mounting hole 47 may vary to accommodate the diameters of various fasteners. In another embodiment, mounting hole 47 has a diameter configured to correspond to the diameter of an extension member of a roof deck mounted solar panel support element, as described in greater detail below.

Figure 2D:
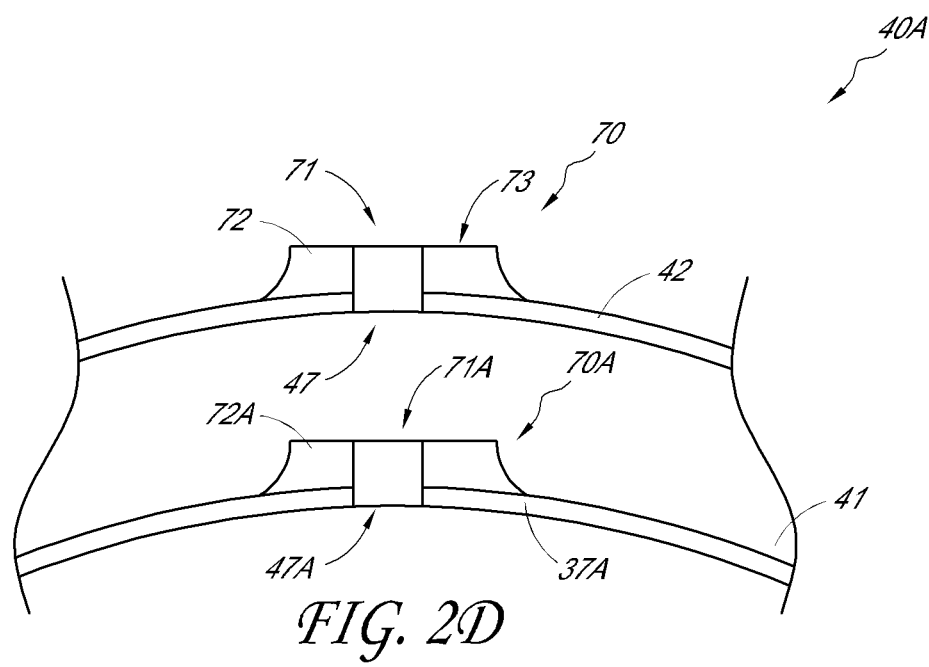
FIG. 2D is a cross-sectional view of a portion of an embodiment of an S-shaped tile vent.

In embodiments of secondary vent member 45 that include the skeleton 41 spaced apart from the cap member 42, the mounting hole 47 can extend through cap member 42. Additionally, in other embodiments, as seen in FIGS. 2D and 2G, the mounting hole 47 can extend through cap member 42, and a second mounting hole 47A can extend through skeleton 41. Further, the first and second mounting holes 47 and 47A can be coaxially aligned with each other, and further aligned with engagement portions 71 and 71A, if present.

Vent 40 can include various features to provide additional structural stability to a solar panel/frame mounted on element 70. For example, element 70 can include the support surface 73 on which a solar panel/frame can be mounted, as mentioned above. Support surface 73 can be substantially flat. Vent 40 can include portions that extend inwardly and/or downwardly into vent 40, for additional structural stability. For example, one or more members can extend downwardly from a portion of vent 40, such as cap 42, and mount to another portion of vent 40 or a portion of a roof, such as roof deck 14. Body 72 can extend through cap 42 and attach to another portion of vent 40, such as screen 37 or skeleton 41, or another portion of a roof. A second body, separate from body 72, can extend downwardly from a portion of vent 40, such as cap 42, and attach to another portion of vent 40, such as screen 37 or skeleton 41, or another portion of a roof.

Figure 2E:
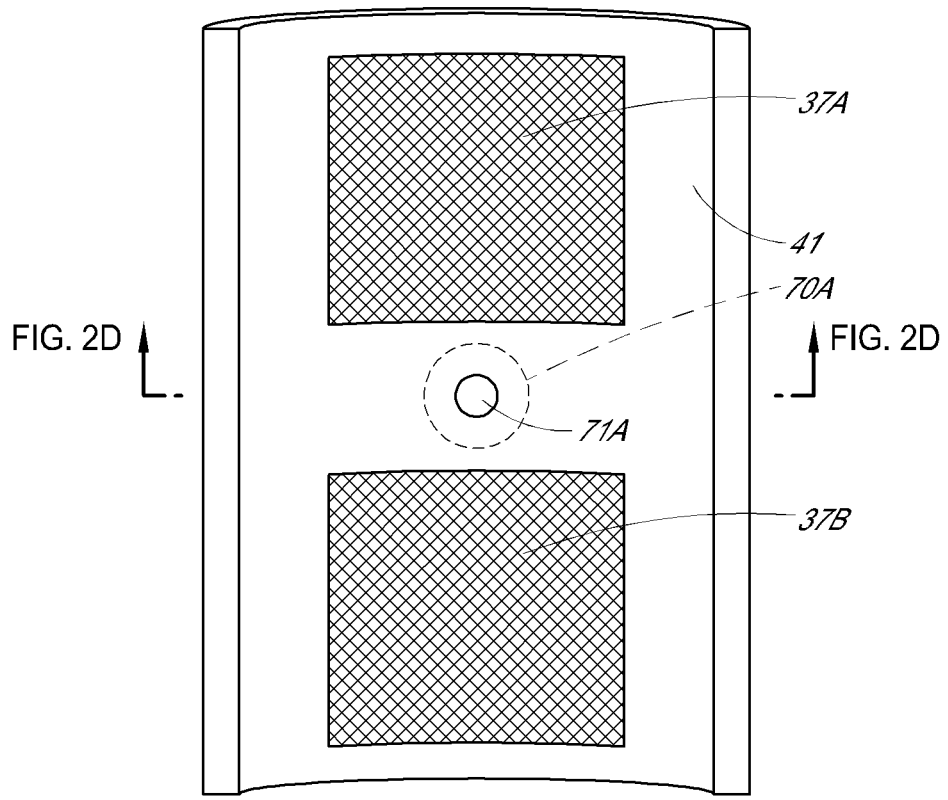
FIG. 2E is a bottom view of the S-shaped tile vent of FIG. 2D.

FIGS. 2D and 2E show an embodiment of a vent 40A that includes a second solar panel support element 70A mounted to another portion of vent 40A, such as skeleton 41, for additional structural stability. Support element 70A can include a body 72A and engagement portion 71A similar to support element 70. During installation, a bolt, fastener, or other extension member can be extended through both support elements 70 and 70A, to attach the vent 40A to a solar panel. A bolt or other fastener member can be extended through both elements 70 and 70A and accessed and secured from a position below vent 40 (e.g., without removing screen 37). Support element 70A can extend through or be mounted to a portion of screen 37. In some embodiments, support element 70A can be mounted to skeleton 41, for additional structural stability. For example, as seen in FIG. 2E, support element 70A can be mounted to a skeleton portion 41A positioned between screen sections 37A and 37B, for additional structural support. Support element 70A can extend from an upper or lower surface of skeleton 41 or screen 37. For example, support element 70A can extend between an upper surface of skeleton 41 and a lower surface of cap 42, to provide support therebetween.

Figure 2F:
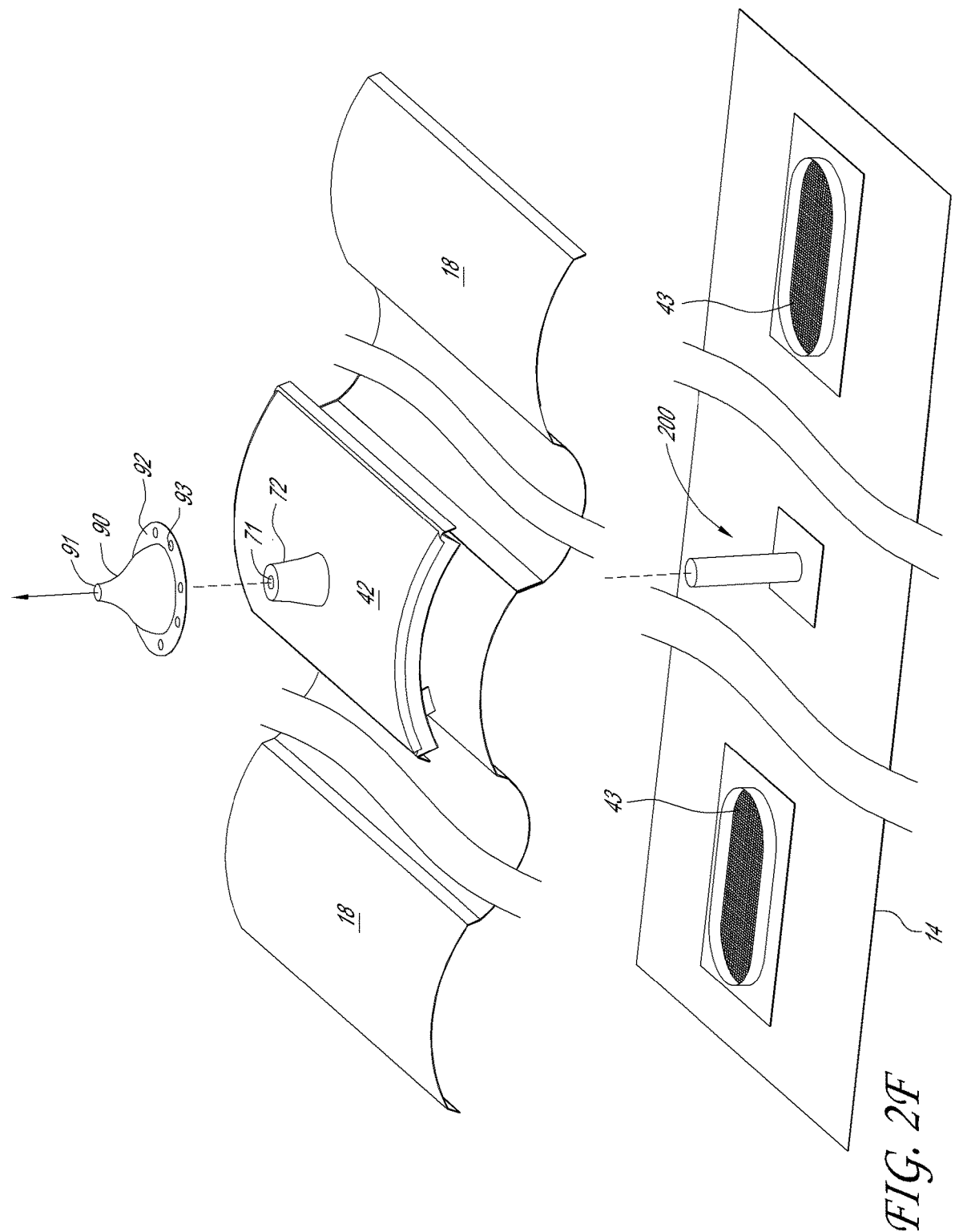
FIG. 2F is an exploded perspective view of a portion of an embodiment of an S-shaped vent including a roof-deck mounted solar support element.
Figure 2G:
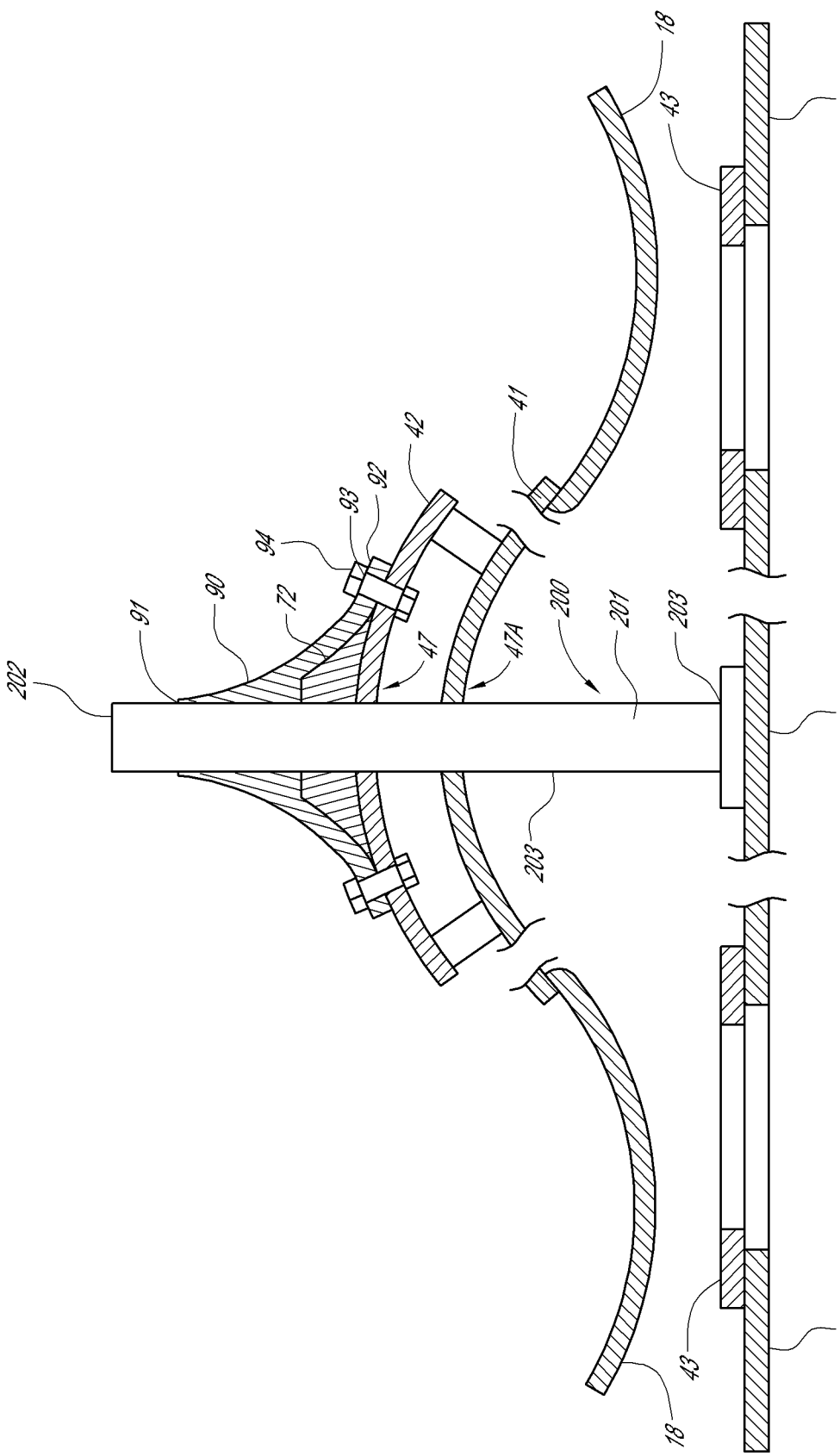
FIG. 2G is a front cross-sectional view of a portion of the portion of the S-shaped vent and roof-deck mounted solar support element of FIG. 2F.

FIG. 2F is an exploded perspective view of a portion of an embodiment of an S-shaped vent including a roof-deck mounted solar support element 200. FIG. 2G is a front cross-sectional view of a portion of the portion of the S-shaped vent and roof-deck mounted solar support element 200 of FIG. 2F. Element 200 may include a base 203 and an extension member 201 extending from the base 203. The extension member 201 may include an attachment portion, such as a mounting surface 202. The attachment portion can be configured and positioned in any way suitable to attach to a solar panel. For example, the attachment portion can be positioned at the end of the extension member 201 opposite the base 203. The base 203 may be configured to mount directly or indirectly to a component positioned below (e.g., directly below or below, but laterally offset) a portion of a vent. For example, the base 203 can be configured to mount to roof deck 14 or primary vent member 43. Accordingly, base 203 may include one or more mounting holes (not shown) or other suitable attachment element(s) configured to attach base 203 to another structure, such as roof deck 14. In some embodiments a flashing member (not shown) may be included to cover base 203 thereby preventing water or other debris from penetrating the roof deck at the point where base 203 is mounted to roof deck 13. An example of such a flashing member is described below with reference to FIG. 2J.

The extension member 201 may extend away from (e.g., upwardly) from the from base 203, to allow base 203 to be mounted below a vent, while the extension member 201 extends through a portion of the vent. In some embodiments the extension member 201 is a substantially cylindrical post as shown in FIG. 2F. However, it should be appreciated that the extension member 201 could have a different cross-sectional shape, e.g., circular, elliptical, square, rectangular, triangular, or L-shaped. The extension member 201 can have a substantially uniform or non-uniform cross-sectional shape along its length. In some embodiments, the shape of extension member 201 is configured to correspond to mounting holes 47 and/or 47A in the secondary vent member 45 and/or holes in corresponding elements 70 and/or 70A (e.g., engagement portions 71 and 71A). In some embodiments, elements 70 and/or 70A may be omitted entirely such that extension member 201 may extend through and one or more mounting holes in a vent, such as mounting holes 47 and/or 47A in the secondary vent member 45. In this way, element 200 can be mounted to roof deck 14 and extend through a portion of a vent, such as secondary vent member 45, to provide a mounting point for a solar panel generally above the secondary vent member 45. In some embodiments, element 200 is positioned on roof deck 14 generally below secondary vent member 45. For example, referring to FIG. 2F, one or more primary vent members 43 can be mounted on the roof deck laterally offset to the element 200.

Figure 2H:
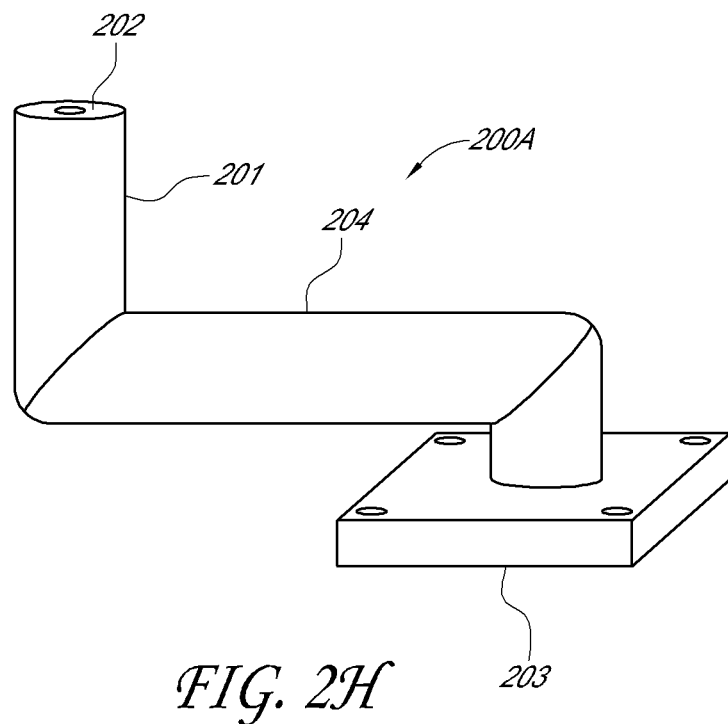
FIG. 2H is a perspective view of an embodiment of a solar panel support element.
Figure 2J:
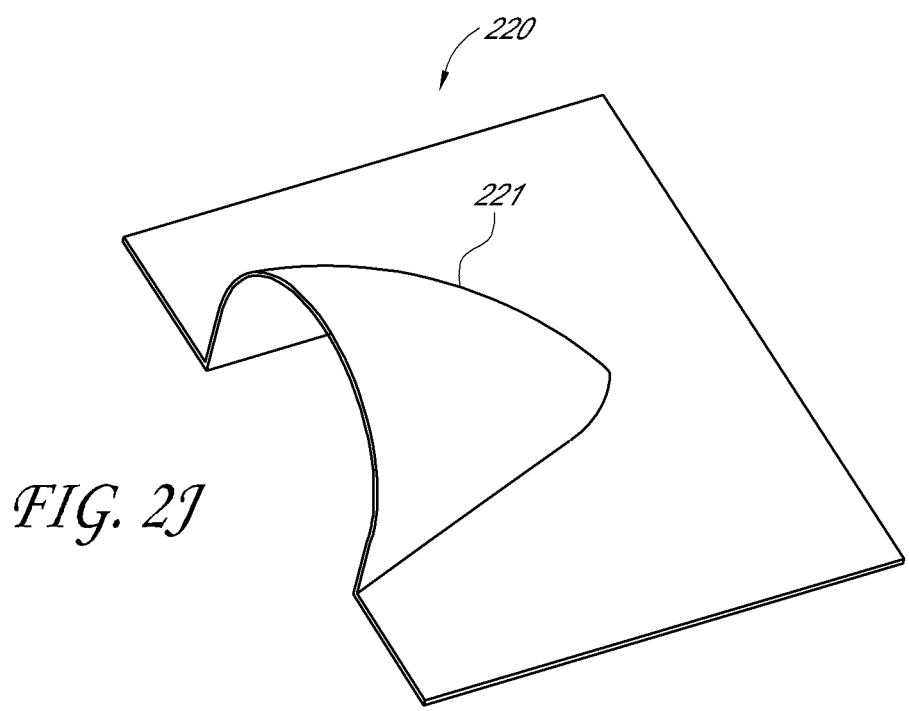
FIG. 2J is a perspective view of an embodiment of a flashing member configured for use with a solar panel support element.
Figure 2I:
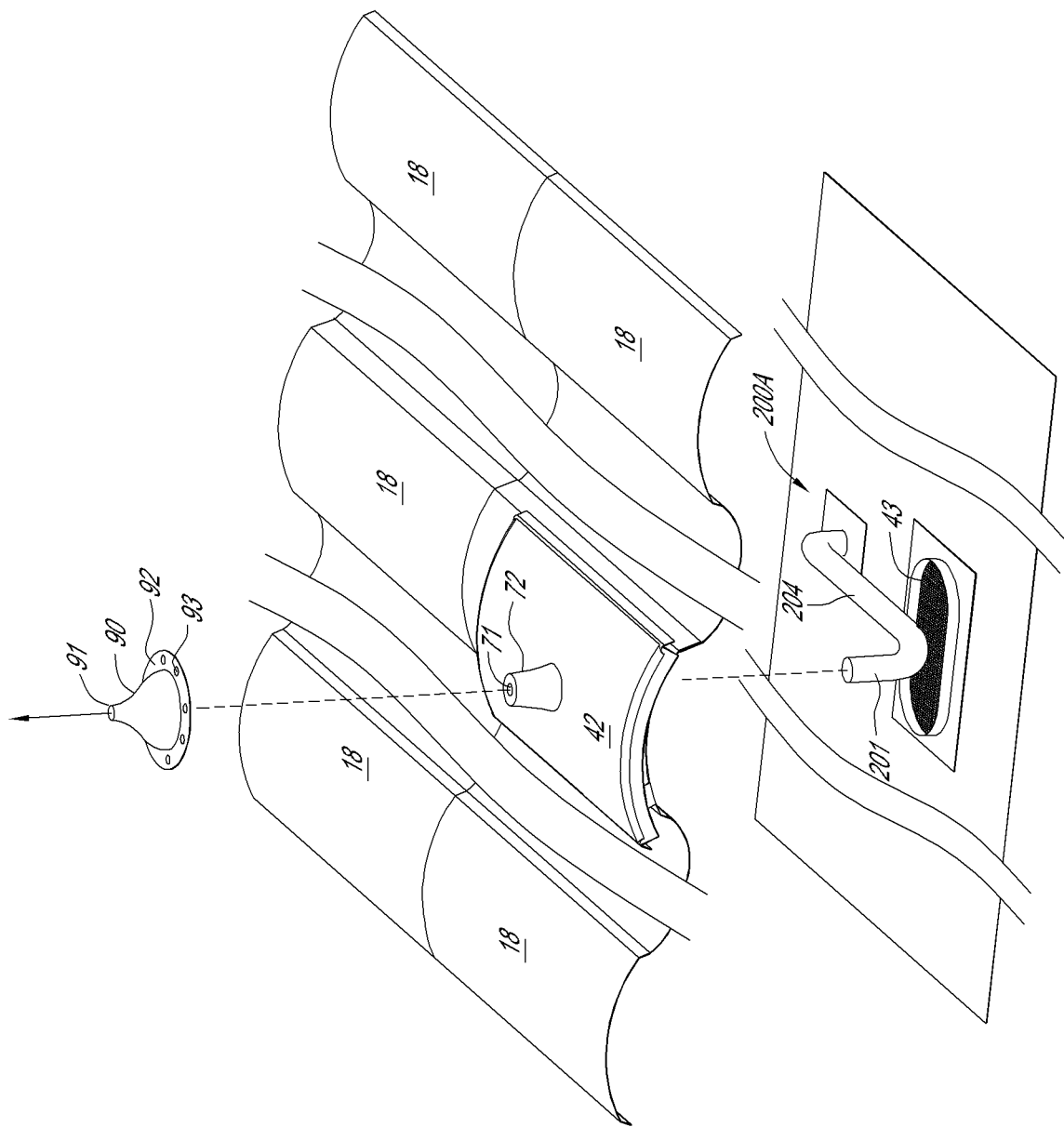
FIG. 2I is an exploded perspective view of a portion of an embodiment of an S-shaped vent configured to support a solar panel on a portion of a roof deck.

FIGS. 2H and 2I illustrate an embodiment of a roof deck mounted solar panel support element 200A. Element 200A can include a base 203, and an extension member 201, similar to element 200 (FIGS. 2F and 2G). A difference is that element 200A can include an offsetting member 204 extending between the base 203 and extension member 201. The offsetting member 204 may be configured to laterally offset the base 203 from the extension member 201, thereby allowing extension member 201 to extend upward (away from base 203) at a position that is laterally offset relative to (e.g., not directly above) base 203. As shown in FIG. 2I, the offset member 204 can allow element 200A to be mounted to roof deck 14 at a point that is laterally offset from the primary vent member 43. The offsetting member 204 is configured so that extension member 201 can extend upward (away from the roof) at a position generally above the opening in primary vent 43. Extension member 201 can then extend through a portion of a vent, such as through mounting holes 47 and/or 47A in the secondary vent member 45, and element 70 and/or 70A if present. Extension member 201 can then attach to, directly, or indirectly, a portion of the vent. By including the offsetting member 204, the element 200A can allow a solar panel to be supported generally above a secondary vent member 45 when the secondary vent member 45 is installed directly above a primary vent member 43. Such an embodiment may allow the secondary vent member and primary vent member to be approximately aligned with each other, which can provide improved airflow through the vent, relative to a vent that has a secondary vent member installed laterally offset from a primary vent member.

It will be appreciated by one of skill in the art that element 200A can be mounted in any position that is laterally offset relative to the primary vent member 43 and/or secondary vent member 42. For example, element 200A can be configured and positioned on a roof deck, such that base 203 is mounted in a position offset from a first side of a vent, and the offsetting member 204 extends completely underneath the vent and beyond a second side of the vent that is opposed to the first side. Such an embodiment can allow extension member 201 to extend upwardly from the offsetting member 204 at a position beyond the second side of the vent, such that the extension member does not extend through an opening in the vent.

Element 200A may also be configured so that the offsetting member 204 extends between two or more bases 203 and the extension member 201 extends from the offsetting member at a point along the offsetting member 204 between the two bases 203. This configuration would allow element 200A to effectively "straddle" a primary vent member 43. Such an embodiment is described below with reference to FIG. 2K.

FIG. 2J illustrates a flashing member 220 that may be used with element 200A. After base 203 of element 200A is mounted to the roof deck, flashing member 220 can be installed over element 200A with the base 203 covered by hood 221 and extension member 204 extending out from the opening in the hood 221. The flashing member 220 may be used when the base 203 is attached to the roof deck at a position upslope from the extension member 201. The flashing member 220 is configured to divert water running down the roof's slope away from the point where base 203 is mounted, thereby helping to maintain the integrity of the roof.

Figure 2K:
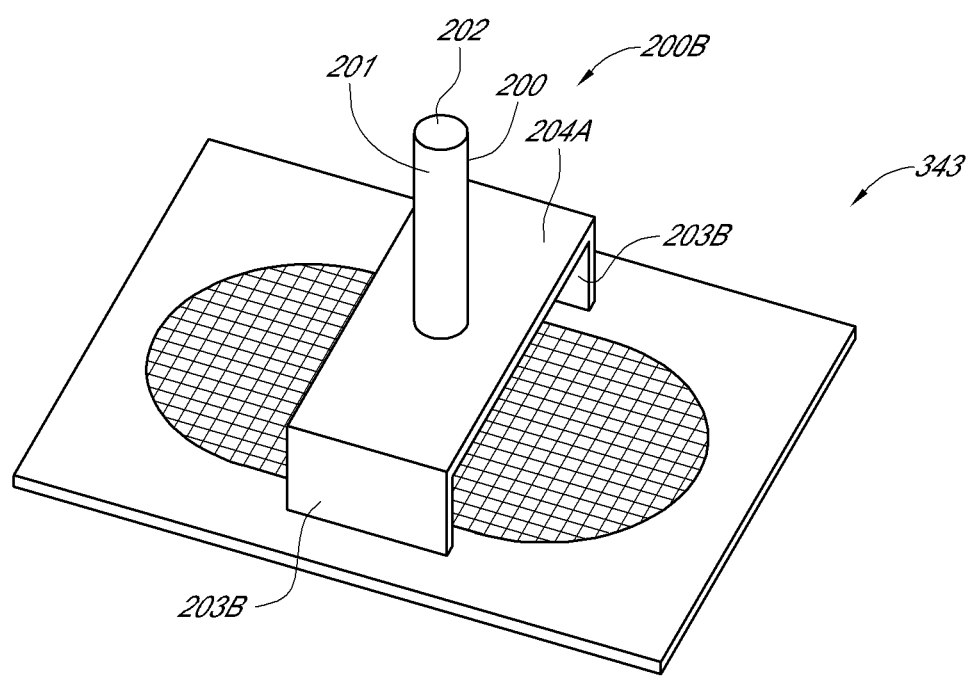
FIG. 2K is an embodiment of a solar panel support element positioned above a primary vent member.

FIG. 2K is an embodiment of a solar panel support element 200B positioned above a primary vent member 434. Primary vent member 434 is configured to be mounted on a roof deck and includes an opening 346. Opening 346 may be covered by a screen. The support element 200B can include two or more bases 203B with an offsetting member 204A configured to extend between bases 203B and extend across the opening 346. The support structure 205 can be attached to the primary vent member 434, or an adjacent structure, such as a portion of a roof deck. The solar panel support element 200B can include an extension member 201 as described in other embodiment herein.

Referring to FIGS. 2F, 2G, and 2I, the extension member 201 can be sealed with respect to the secondary roof vent member 45 and/or element 70 by means of a sealing element, such as a gasket 90. In some embodiments, the sealing element can function as an intermediate structure that attaches a portion of a solar panel support element, such as the extension member 201, to a portion of the vent, such as the secondary vent member 45. Gasket 90 may be configured in size and shape to surround element 70 when extension member 201 extends therethrough. Gasket 90 may further include a flange 92 that can be attached to the secondary vent member 45. In some embodiments, the flange 92 is attached to secondary vent member 45 such that a watertight seal is formed between the gasket 90 and the secondary vent member 45. The gasket 90 may be attached to the secondary member 45 by a fastener 94 that extends through an opening 93 in the flange 92. In some embodiments, the gasket 90 is attached with adhesive and the adhesive may form the watertight seal. In other embodiments, the gasket 90 is bolted to the secondary vent member 45 and the watertight seal is achieved by means of an O-ring disposed between the flange 92 and secondary vent member 45. In still other embodiments, the O-ring may be omitted.

Gasket 90 may further include an opening 91 configured to allow extension member 201 to extend through the opening 91. In some embodiments a watertight seal is formed between opening 91 and extension member 201, by, for example, sizing the opening 91 so that the fit between opening 91 and extension member 201 is sufficiently tight to provide a watertight barrier. In other embodiments a hose clamp may be installed below the opening, thereby providing the watertight seal. In still other embodiments, caulking, sealing tape, welding or adhesive may form the watertight seal. Gasket 90 may be made from rubber, plastic, metal, composite, or any other suitable material.

It will be appreciated by one of skill in the art that gasket 90 may be configured to provide a watertight seal between extension member 201 and secondary vent member 45 and/or element 70. In some embodiments, element 70 may be omitted and the gasket may form a seal between the secondary vent member 45 and the extension member 201. In other embodiments, the gasket forms a seal between the extension member 201 and element 70 and may not be directly attached to the secondary vent member 45. Further, it should be understood that other methods for providing a watertight seal are within the scope of this invention. For example, a gasket may not be used and the watertight seal may still be achieved by the use of an O-ring disposed between the extension member 201 and the secondary vent member 45 and/or element 70. Or the joints between the extension member 201 and the secondary vent member 45 and/or element 70 may be sealed with caulking or welding.

Although the aforementioned solar panel support elements 70, 70A, 200 and 200A have been illustrated and described in the context of being attached to an S-shaped vent, skilled artisans will understand that they can be attached to other curved vents or flat vents, as shown through FIGS. 3A-5.

Figure 3A:
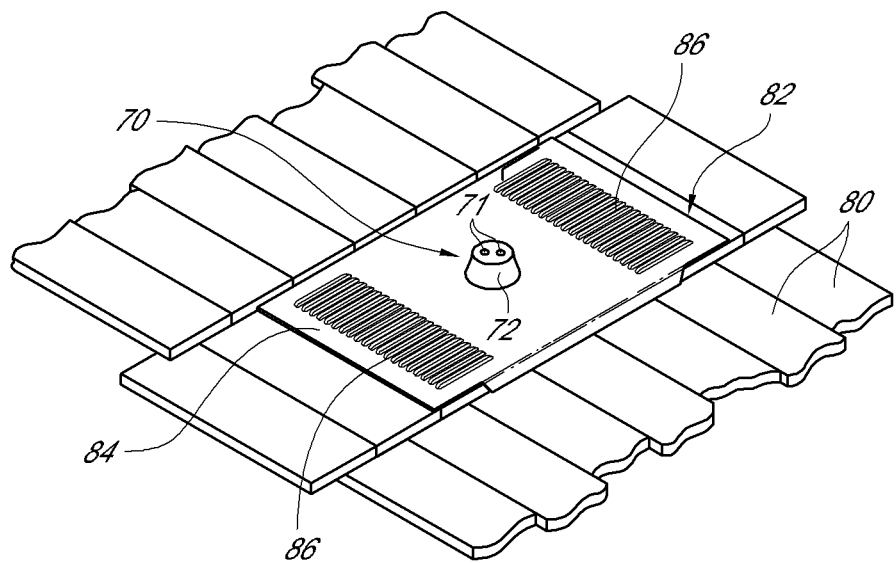
FIG. 3A is a perspective view of a tile roof comprising flat tiles and having a flat tile vent.
Figure 3B:
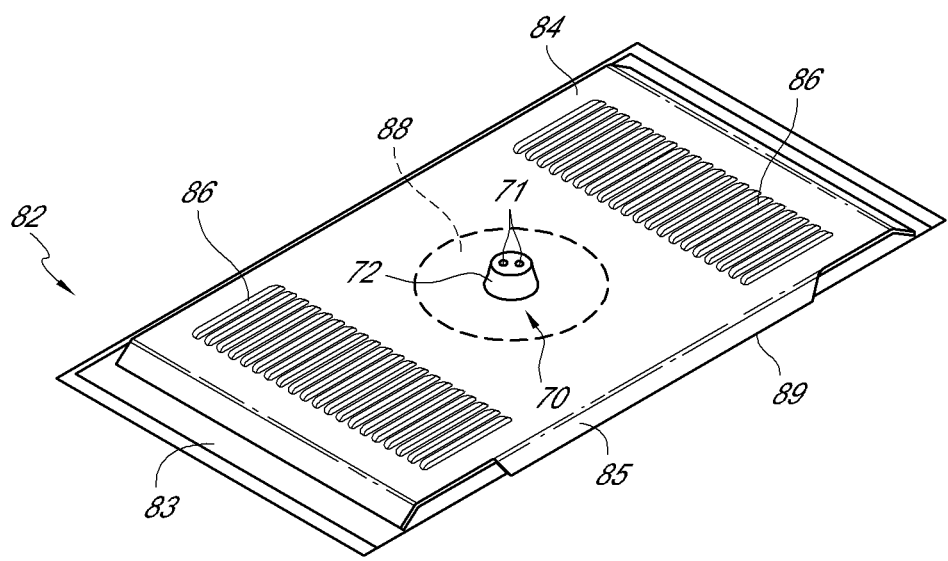
FIG. 3B is a perspective view of the flat tile vent of FIG. 3A.
Figure 3C:
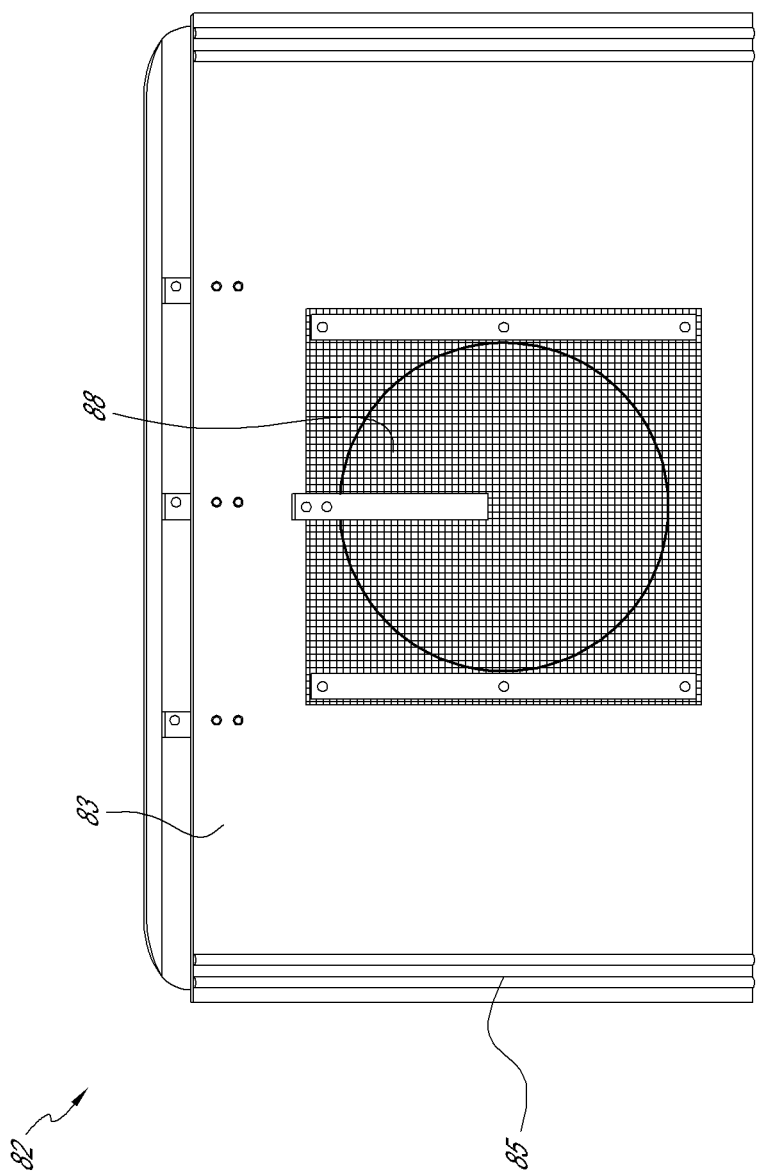
FIG. 3C is a bottom view of the flat tile vent of FIG. 3A.

FIGS. 3A-3C illustrate a substantially flat tile vent 82 that includes one or more solar panel support elements 70. FIG. 3A is a perspective view of a portion of a tile roof comprising flat tiles 80 and having the substantially flat tile vent 82. The flat tile vent 82 can replace one or more of the flat tiles 80. FIGS. 3B and 3C are perspective and bottom views, respectively, of the tile vent 82. A variety of different types of flat tile vents can be employed. For example, the tile vent 82 may be substantially as shown and described in U.S. Pat. No. 6,129,628. Accordingly, the tile vent 82 can comprise a lower substantially flat base 83 and a substantially flat cover member 84. The base 83 has an opening 88 in fluid communication with an aperture (not shown) in the roof deck. Preferably, the cover member has one or more openings 86, such as louvers as shown. In use, attic air travels through the roof deck aperture, the base opening 88, and through the openings 86 and/or through a front opening 89 between the base 83 and a front edge or flange 85 of the cover member 84. The vent 82 is preferably configured to blend in with and mimic the appearance of the flat tiles 80. The flat tile vent 82, and its solar panel support elements 70, can function similar in many ways as the S-shaped vent 40 (FIGS. 2A-2C).

Figure 4A:
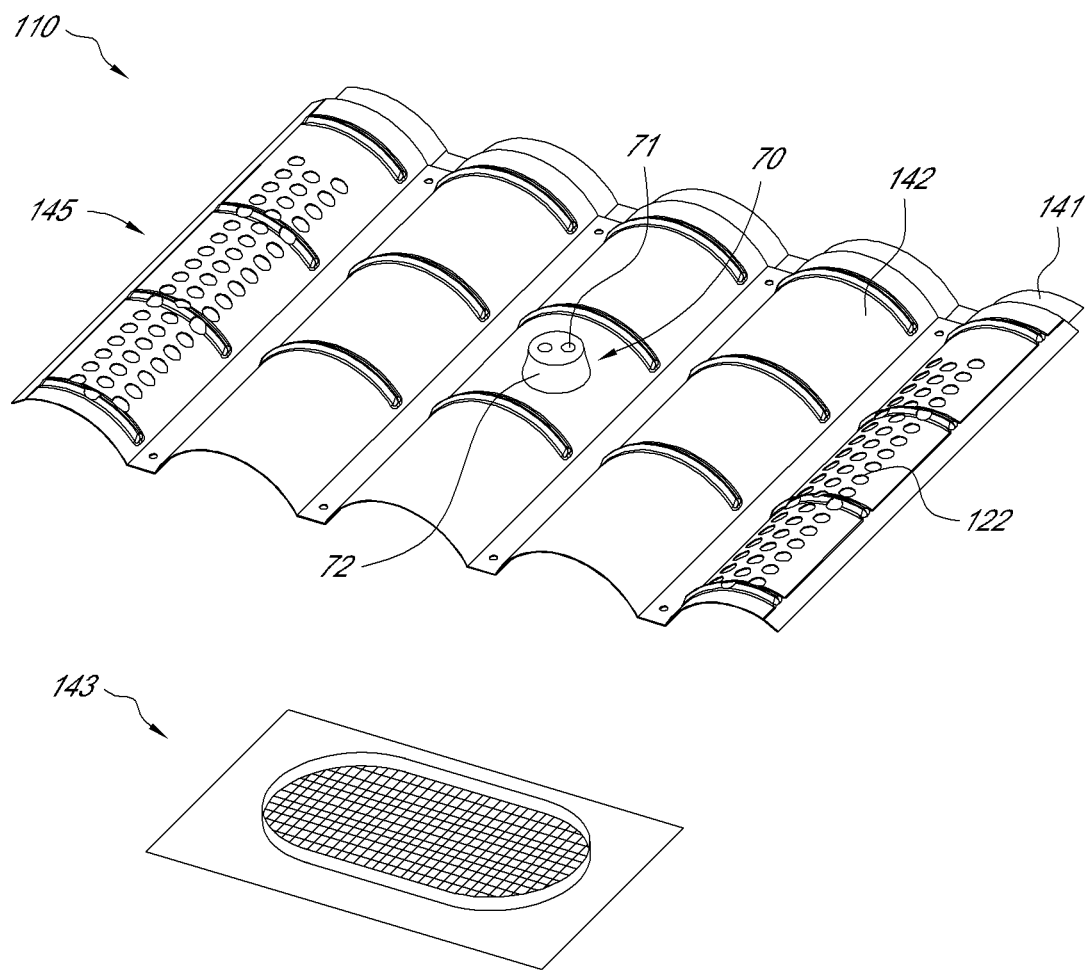
FIG. 4A is a perspective view of an M-shaped tile vent and a roof screen.
Figure 4B:
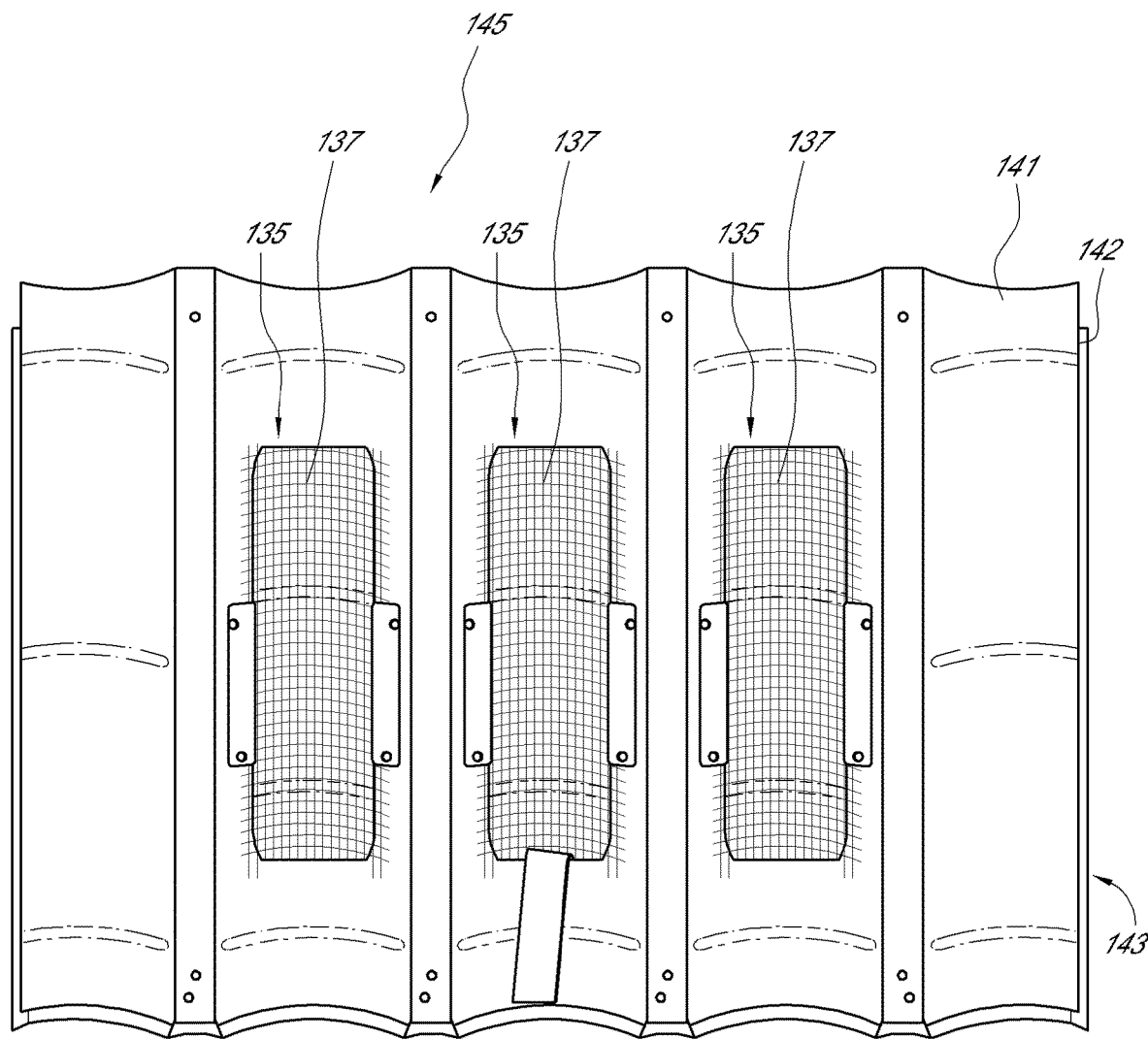
FIG. 4B is a bottom view of the M-shaped tile vent of FIG. 4A.

FIGS. 4A-4B illustrate an M-shaped tile vent 110 that includes one or more solar panel support elements 70. Vent 110 can mimic the shape of M-shaped concrete tiles. In the illustrated embodiment, the tile vent 110 mimics the appearance of five roof tiles. However, skilled artisans will appreciate that the vent 110 can mimic the appearance of any desired number of roof tiles, including just one roof tile, or more than five roof tiles.

The roof vent 110 includes a lower (primary) vent member 143 and a secondary (upper) vent member 145. The primary vent member can be similar to primary vent member 43 (FIGS. 2A-2C). The secondary vent member 145 can include a first (lower) portion 141 spaced below a second (upper) portion 143, similar to skeleton 41 and cap 42 (FIGS. 2A-2C). The first and second portions are joined together but separated by a space 143. Referring to FIG. 4A, the first portion 142 includes apertures 122, or openings, through which air can flow between regions above and below upper member 145. In other embodiments, other openings, such as louver slits, grating or screened openings, can be used in place of apertures 122. Referring to FIG. 4B, the second portion 141 includes openings 135 with screens 137 through which air can flow. In other embodiments, other openings, such as louver slits or apertures, can be used in place of screened openings 135. In use, air flows through the screened openings 135 in the second portion 141, then through the space 143, and then through the apertures 122 in the first portion 142. The M-shaped tile vent 110, and its solar panel support elements 70, can function similar in many ways as the S-shaped vent 40 (FIGS. 2A-2C).

Figure 5:
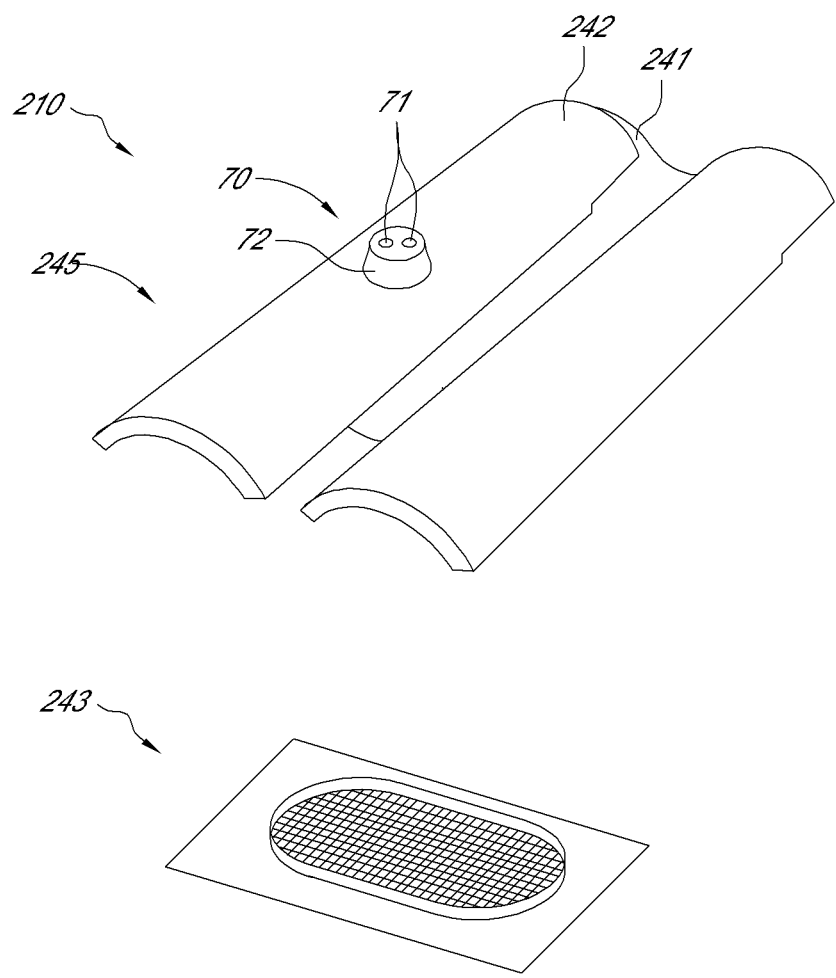
FIG. 5 is a perspective view of an M-shaped tile vent and a roof screen.

FIG. 5 illustrates an M-shaped tile vent 210 that includes one or more solar panel support elements 70. Vent 210 can mimic the shape of M-shaped clay tiles. In the illustrated embodiment, the tile vent 210 mimics the appearance of two roof tiles. However, skilled artisans will appreciate that the vent 210 can mimic the appearance of any desired number of roof tiles, including just one roof tile, or more than two roof tiles.

The roof vent 210 includes a lower (primary) vent member 243 and a secondary (upper) vent member 245 that can be similar to primary vent member 143 and secondary vent member 145 (FIGS. 4A-4B). The secondary vent member 245 can include a first (upper) portion 242 spaced above a second (lower) portion 241, similar to upper portion 142 and lower portion 141 (FIGS. 4A-4B). The M-shaped clay tile vent 210, and its solar panel support elements 70, can function similarly to the other vents and solar panel support elements described herein.

While described and illustrated in the context of tile roofs, the panel support elements 70 can be applied to a variety of different types of roof coverings, including shingles and composition sheeting.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A roof vent comprising:
   an upper vent member comprising:
      an upper portion and a lower portion, wherein a gap extends between at least part of the upper portion and the lower portion to form a cavity between the upper portion and the lower portion; and
      a hole extending through the lower portion;
   a first support element attached to the lower portion of the upper vent member; and
   a lower vent member configured to be secured to a roof deck,
   wherein the hole is configured to receive an extension member extending from the roof deck and into the hole, and wherein the upper vent member, lower vent member and support element are configured to permit airflow between a region below the roof deck, through the lower vent member, through a region between the roof deck and the upper vent member, through the cavity, and to the outside.

2. The roof vent of claim 1, further comprising another hole, the another hole extending through the upper portion, wherein the hole and the another hole are coaxially aligned with respect to each other.

3. The roof vent of claim 1, further comprising a second support element attached to the upper portion, and a first body extending upwardly from an upper surface of the upper vent member.

4. The roof vent of claim 1, wherein the first support element is attached to and extends from an upper surface of the lower portion towards a lower surface of the upper portion.

5. The roof vent of claim 3, wherein the upper surface of the upper portion of the upper vent member is curvilinear.

6. The roof vent of claim 5, wherein the upper surface comprises an apex, and wherein the second support element is positioned on the apex of the upper surface.

7. The roof vent of claim 2, wherein the hole and the another hole of the upper vent member, and the lower vent member are approximately coaxially aligned with respect to each other.

8. The roof vent of claim 7, wherein the extension member is approximately coaxially aligned with respect to the hole and the another hole of the upper vent member, and the lower vent member, and the extension member extends through the lower vent member, the hole and the another hole, and across the gap.

9. The roof vent of claim 8, wherein the upper vent member is configured to mimic an appearance of an M-shaped roof tile, an S-shaped roof tile, or a flat roof tile.

10. The roof vent of claim 9, wherein the upper vent member is configured to mimic the appearance of the S-shaped roof tile.

11. The roof vent of claim 9, wherein the upper vent member is configured to mimic the appearance of the M-shaped roof tile.

12. The roof vent of claim 9, wherein the upper vent member is configured to mimic the appearance of the flat roof tile.

13. The roof vent of claim 1, wherein the lower portion of the upper vent member further comprises two screens laterally separated with respect to each other on the lower portion, with the hole positioned between the two screens, and wherein the screens are configured to permit airflow between a region below the lower portion and the gap.

14. The roof vent of claim 1, wherein the lower vent member is laterally offset with respect to the upper vent member.

15. The roof vent of claim 1, wherein the upper vent member is further configured to mimic an appearance of a roof cover element.

16. The roof vent of claim 1, wherein the first support element comprises a first solar panel support element, and further comprising another solar panel support element, the another solar panel support element comprising a base and the extension member.

17. The roof vent of claim 1, wherein the airflow through the cavity and to the outside comprises lateral airflow.

18. A roof comprising:
the roof vent of claim 1; and
a roof deck with an aperture extending therethrough, the aperture coaxially aligned with the hole, and the aperture configured to receive the extension member.

19. The roof of claim 18, wherein the extension member extends through the aperture.

20. A roof vent comprising:
an upper vent member comprising:
an upper portion and a lower portion, wherein a gap extends between at least part of the upper portion and the lower portion; and
a hole extending through the lower portion; and
a support element attached to the lower portion of the upper vent member;
wherein the hole is configured to receive an extension member extending from a roof deck, through the hole and the gap, to a position above the lower portion of the upper vent member, wherein the lower portion of the upper vent member further comprises two screens laterally separated with respect to each other on the lower portion, with the hole positioned between the two screens, and wherein the screens are configured to permit airflow between a region below the lower portion and the gap.

* * * * *